May 17, 1938.  R. F. WEISER  2,117,778
APPARATUS FOR MACHINING AND THREADING PIPE SOCKETS AND THE LIKE
Filed Aug. 22, 1936  9 Sheets-Sheet 1
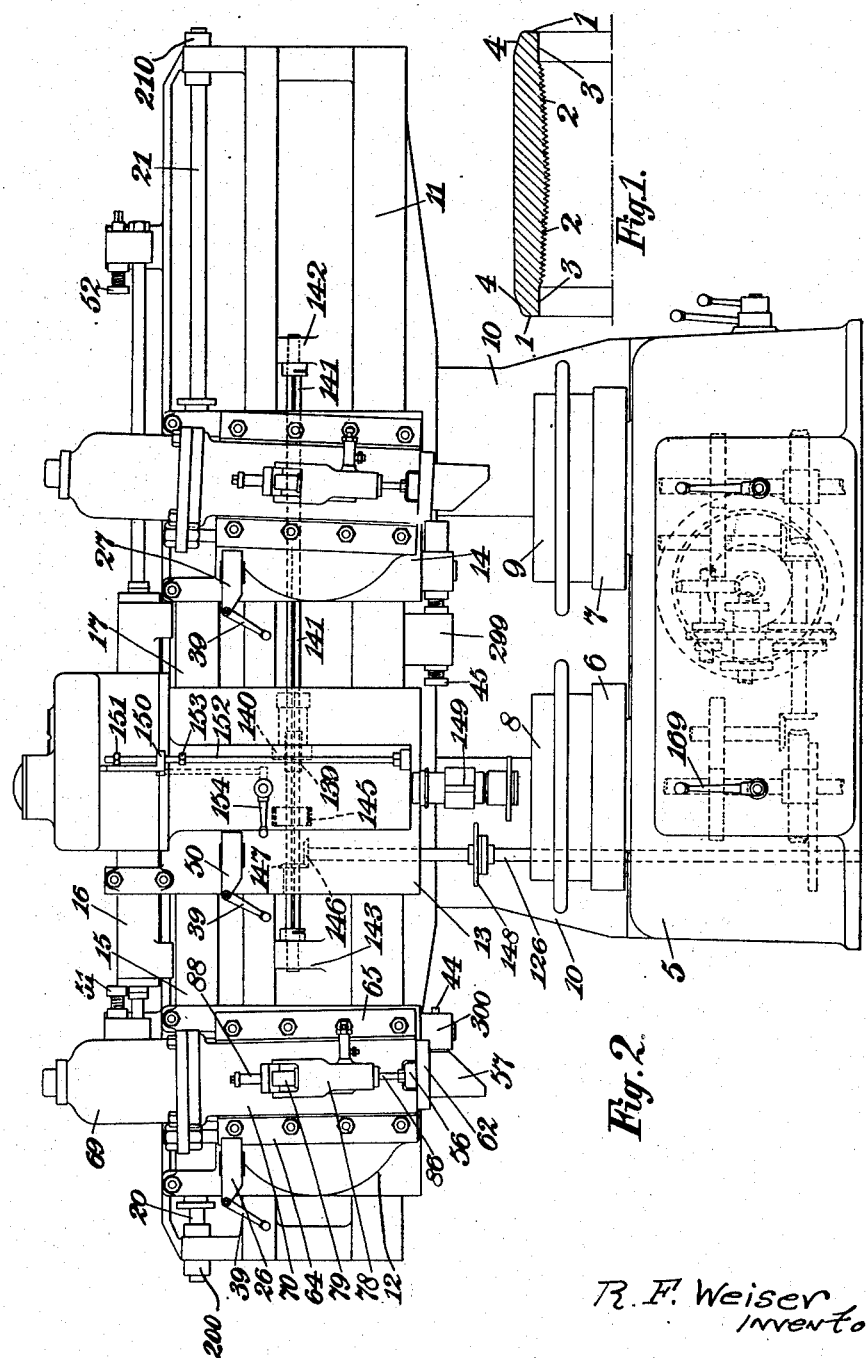
R. F. Weiser
Inventor May 17, 1938.　　　R. F. WEISER　　　2,117,778
APPARATUS FOR MACHINING AND THREADING PIPE SOCKETS AND THE LIKE
Filed Aug. 22, 1936　　　9 Sheets-Sheet 2
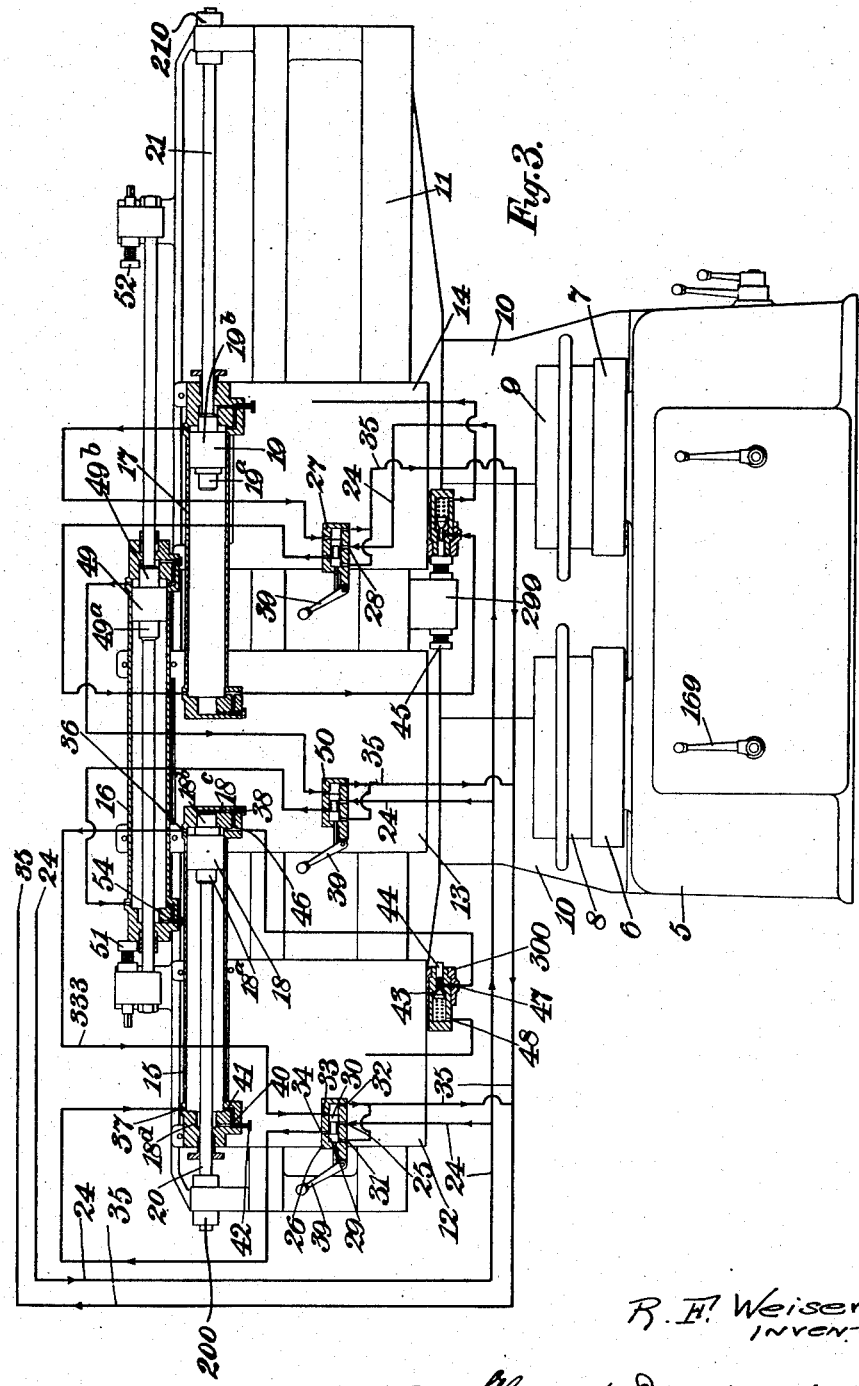

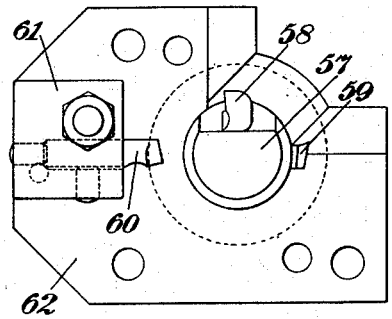
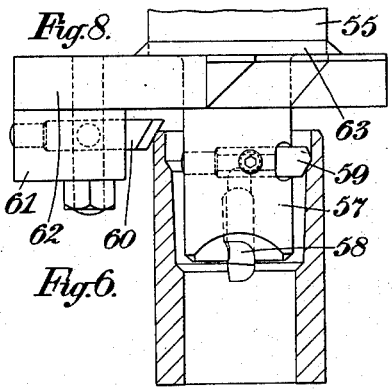
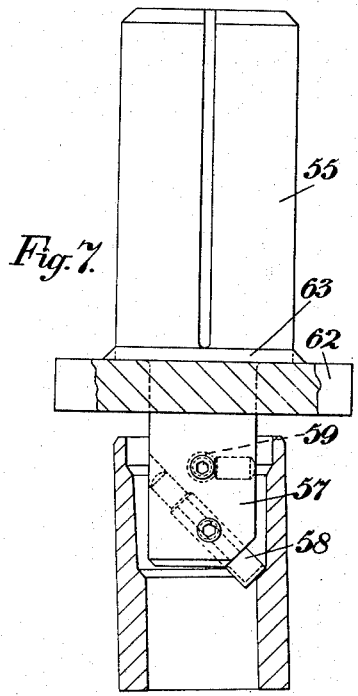
Fig. 8.
Fig. 6.
Fig. 7.
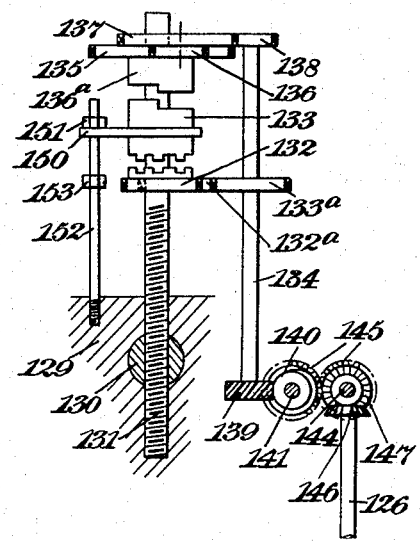
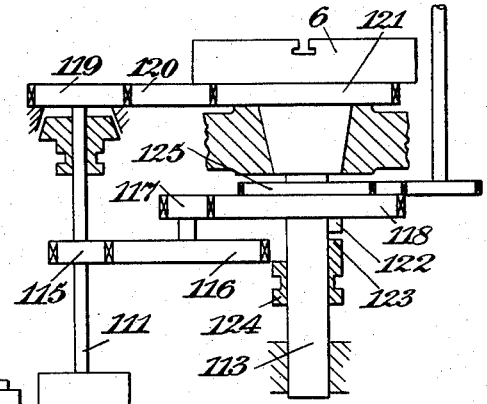
Fig. 14.
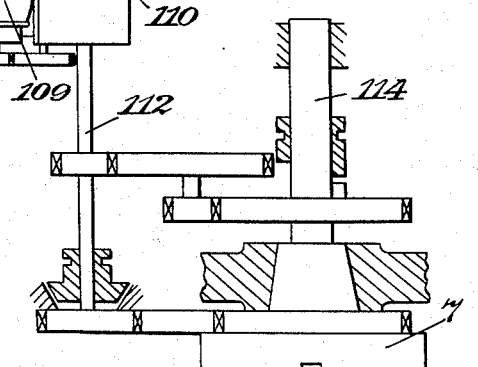

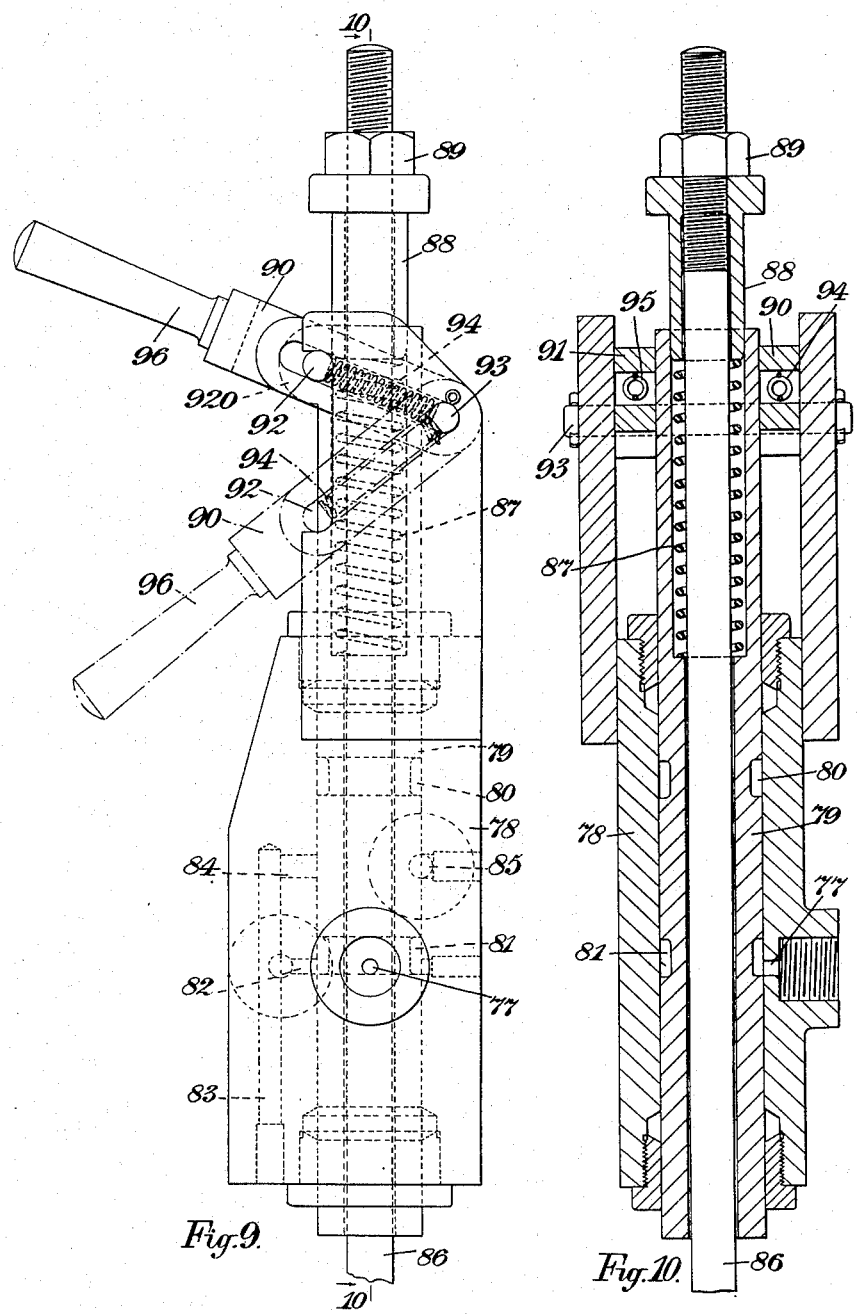

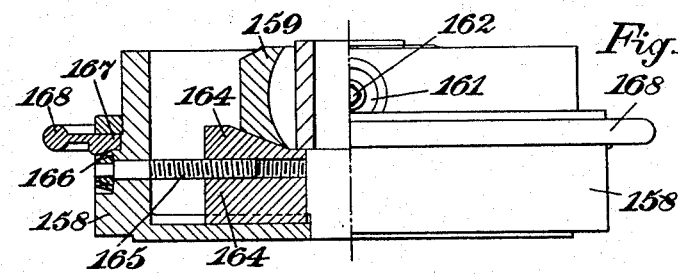
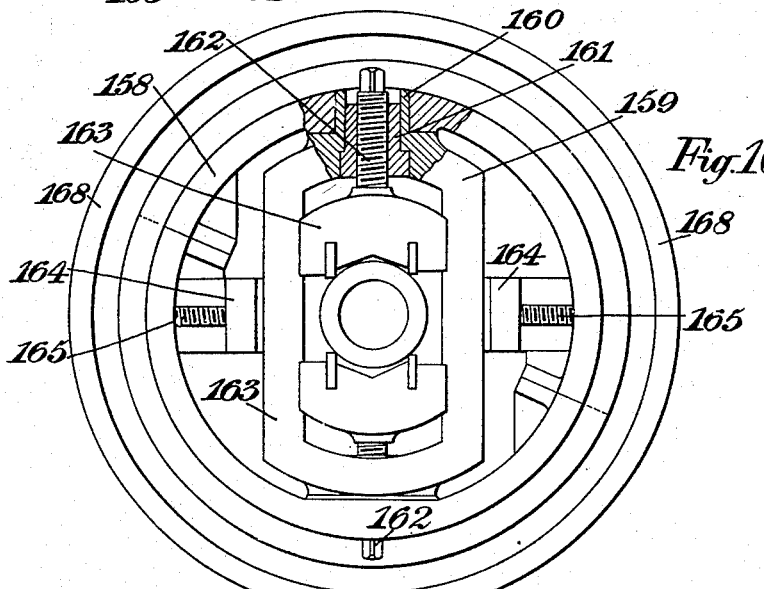
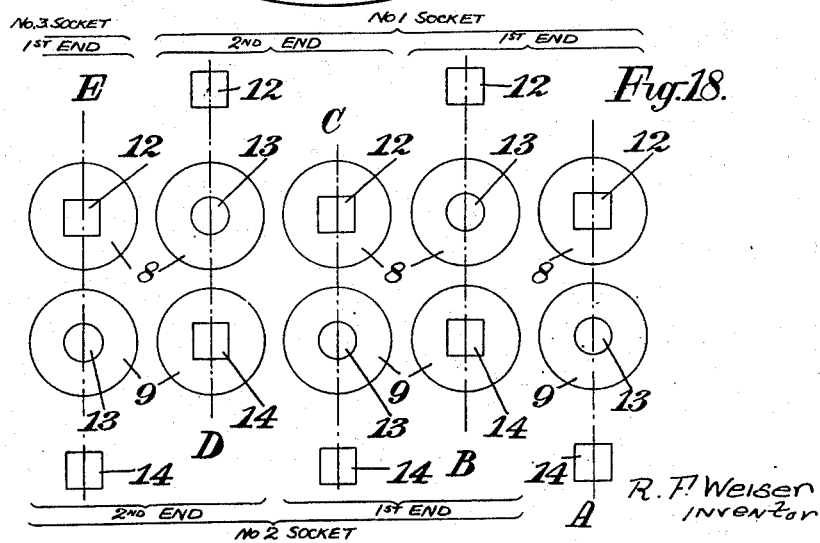

UNITED STATES PATENT OFFICE 2,117,778

APPARATUS FOR MACHINING AND THREADING PIPE SOCKETS AND THE LIKE

Rudolf Francis Weiser, Sketty-Swansea, South Wales

Application August 22, 1936, Serial No. 97,454
In Great Britain August 23, 1935

11 Claims. (Cl. 10—128)

The invention relates to a method of and apparatus for machining and/or threading sockets and the like from blanks for the production of such tubular components as couplings, jointers, screwed inserted joints, tool joints or rings as used in the boring tube industry.

In particular the invention is adaptable to the production of sockets for boring tubes having internal screw threads at each end which converge towards the middle of the socket.

In connection with boring tubes the accuracy of the screw threads is a very essential requirement and the more important tolerances which are specified are for:—

(a) The major and minor diameters of the imaginary frustum of cone formed by the thread tops.
(b) Pitch of thread.
(c) Included thread angle.
(d) Alignment of axes of the opposed frustums of cones.

Considered individually the tolerances permitted for these various parts may appear generous, but with the combination of all factors it is impossible with existing machines to work within the full tolerances on mass production lines with dimensions which correspond to a set standard of dimensions and with the obtaining of perfect alignment of the axes of the opposed frustums of cones.

Present day methods consist in chucking the blanks truly to the outside diameter in a lathe, after which one end is faced, bored, recessed, thread depth chamfered, and outer end chamfered, followed by a threading operation of several cuts by means of former tools or chasers. Machining operations, other than threading, are also conducted in several cuts and tool movements. Upon the completion of one end, it is usual for that end to be screwed on to a short tapered plug or mandrel on another lathe, whereupon the same sequence of operations is repeated for the opposite end.

Sometimes the socket blank is machined (other than threading) on a lathe in two settings, after which it is passed to a tapping machine for screw threading one end, whereupon the socket is removed and again screwed on to a short centring plug or mandrel of a second tapping machine which screw threads the opposite end.

The mandrel referred to has a constant pitch diameter and when it is considered that it is impossible to thread sockets without some diameter variation, it will be appreciated that the mandrel must be screwed to the smallest pitch diameter of the thread which is likely to occur in a batch of sockets. On the other hand, when a socket having the largest permissible pitch diameter is screwed upon the mandrel, the slackness between the socket and mandrel makes it impossible to obtain accurate axial alignment of both socket ends.

The above present day methods necessitate chucking each end of the socket separately at least once which renders it practically impossible to ensure that the axes of the two socket ends coincide. This malalignment also affects the thread angle relatively to the true axis of two pipes when coupled together to form a string. It is an essential requirement of the boring tube industry that a string of pipes should be in perfect alignment. It is necessary, therefore, to force pipe lengths which are out of alignment due to incorrectly threaded sockets into a straight line with the result that unbalanced shear forces are imposed upon the thread flanks, and the total moment of resistance of the pipe section is considerably reduced thereby.

The above methods are also open to objection that they are expensive and moreover the maintenance of the socket dimensions is dependent upon the degree of diligence and dexterity of the operator.

The object of my invention is to eliminate the above objections to existing methods of and machines for machining and threading sockets and the like.

According to my invention a socket or like blank is initially set up in a machine, the necessary machining operations are effected on one end of the blank and then, without disturbing the setting of the blank, the other end thereof is treated in a like manner.

According to a further feature of the invention a pair of sockets or like blanks are initially set up in a machine and whilst one end of one blank receives the necessary machining operation, one end of the other and previously machined blank is simultaneously screw threaded.

The invention also consists in a machine for machining sockets, pipes and the like and/or for screw threading the same wherein a reversible chuck is provided whereby after a socket has been initially set up in the chuck both ends of the socket can be machined without disturbing this setting.

The invention also consists in a machine for machining and screw threading sockets, pipes and the like wherein a pair of chucks are provided in combination with two machining heads and a screw threading head all of which heads are movable to occupy positions relatively to the chucks such that while one end of one socket or the like is being machined by one of the said machining heads the end of the other socket or the like which was previously machined by the other machining head is simultaneously threaded by the screw threading head.

The invention also comprises the further features hereinafter described or indicated.

The invention will now be described with reference to the accompanying drawings which show, by way of example, an embodiment of the invention.

Figure 1 is a half longitudinal section of a boring tube socket;

Figure 2 is a front view of the machine;

Figure 3 is a front view of the machine partly in section and showing diagrammatically the hydraulic connections to different parts of the machine;

Figures 6, 7 and 8 are side and end views of the pre-machining tool post;

Figure 9 is a side view of a valve controlling the vertical movements of the pre-machining heads;

Figure 10 is a section on the line 10—10 of Figure 9;

Figure 14 is a diagrammatic view of the mechanical drives for the face plates and for the tap head;

Figures 16 and 17 are plan and part sectional side views respectively of the chuck, and Figure 18 is a diagrammatic representation of the production schedule.

Figure 4:
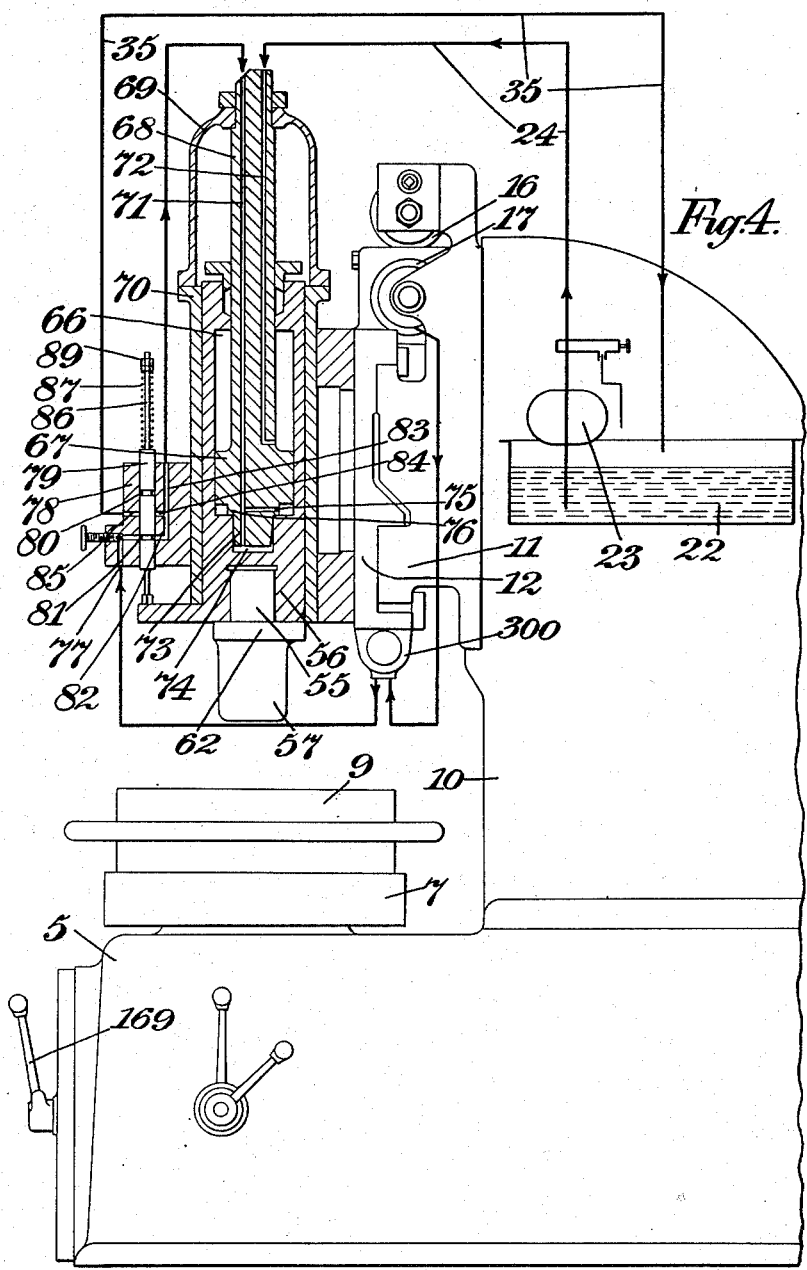
Figure 4 is an end view of the machine with one of the pre-machining heads in section and in the raised position.

Referring now to Figure 1, this shows a half section of a pipe socket which it is desired to produce in large quantities. It will be understood that the socket must be faced at each end at 1 and must be threaded internally with tapered threads 2, the outer end of each threaded portion being recessed at 3 and the exterior of each end of the socket being chamfered as at 4.

For carrying out these operations it is convenient to divide the fabricating operations into two main groups, namely (1) pre-machining and (2) threading. By pre-machining is meant all operations except tapping (or screw threading) and these machining operations are, (a) Facing of socket to length.
(b) Boring taper.
(c) Recessing end.
(d) Chamfering thread start.
(e) Chamfering outside.

These pre-machining operations are followed by a threading or tapping operation which is preferably performed by means of a receding chaser collapsible tap of known kind, but which may be performed by any other suitable appliance, for example a thread milling attachment.

It will be understood that the operations above described must be carried out on each end of the socket, and the double tapered thread must be continuous from one end of the socket to the other, that is to say there must be no step between the threads at the junction of these two threads in the interior of the socket.

GENERAL ARRANGEMENT OF MACHINE

Referring now to Figure 2 the machine comprises a base 5 on which are mounted two rotatable face plates 6, 7 carried by vertical spindles much on the lines of a vertical twin spindle boring mill. Upon each face plate there is mounted a chuck 8, 9 respectively adapted to hold the sockets. The rear of the base has a rear column support 10 upon which is mounted a cross beam 11 which carries three tool posts generally designated by the references 12, 13 and 14 which are arranged to move independently of one another and are in the following sequence; a pre-machining head 12, a tap head 13 and a second pre-machining head 14.

The invention is not limited to the use of vertically arranged spindles and tool posts, since these for smaller units, particularly, may be horizontally disposed. In the case of pipe screwing machines it is of course necessary that the spindles be arranged horizontally. The tool posts 12, 13 and 14 are moved along the cross beam by hydraulic means, including the cylinders 15, 16 and 17 respectively, the control of these movements being described hereafter. The upward and downward movement of the pre-machining heads 12 and 14 is also hydraulically controlled, whilst the upward and downward movement of the tap head 13 is controlled mechanically by a drive which is taken from the drive for the face plates 6 and 7. The control and operation of these movements will be more fully described hereafter.

The sequence of operations to be carried out by the machine will now be described, and the means for effecting these movements will then be described in greater detail.

In operation a socket blank for the production of a socket, as shown in Figure 1, is secured in one of the chucks, for example chuck 8, and the pre-machining head 12 is brought over this chuck and the operations (a) to (e) inclusive, above enumerated, are performed on one end of the socket. The pre-machining head 12 is then moved along the cross beam 11 to the left (Figure 2) and the tap head 13 is brought over the machined end of the socket in the chuck 8. This is the position shown in Figure 2. During the threading operation the operator secures a second socket blank in the chuck 9 and the pre-machining operations on this blank are performed by the second pre-machining head 14.

The screw-tapping operation is generally of longer duration than the pre-machining operation, so that the operator is given sufficient time in which to set up and machine this second socket blank whilst threading of the first blank proceeds. Upon completion of the pre-machining of one end of the second socket in chuck 9 the machining head 14 is moved away from this socket to the right (Figure 2) and replaced by the tap head 13 which then operates to screw thread this end of the second socket. The operator reverses the chuck 8 holding the first socket and repeats the machining operations upon the other end of this socket whilst the tapping of the second socket proceeds. Production then proceeds in an uninterrupted manner by repetition of the sequence of operations above described by adjustment of the nuts 200, 210 respectively.

The hydraulic control of the movements of the pre-machining heads and the tap head will now be described.

Hydraulic Circuits

(a) Pre-machining heads

Figure 5:
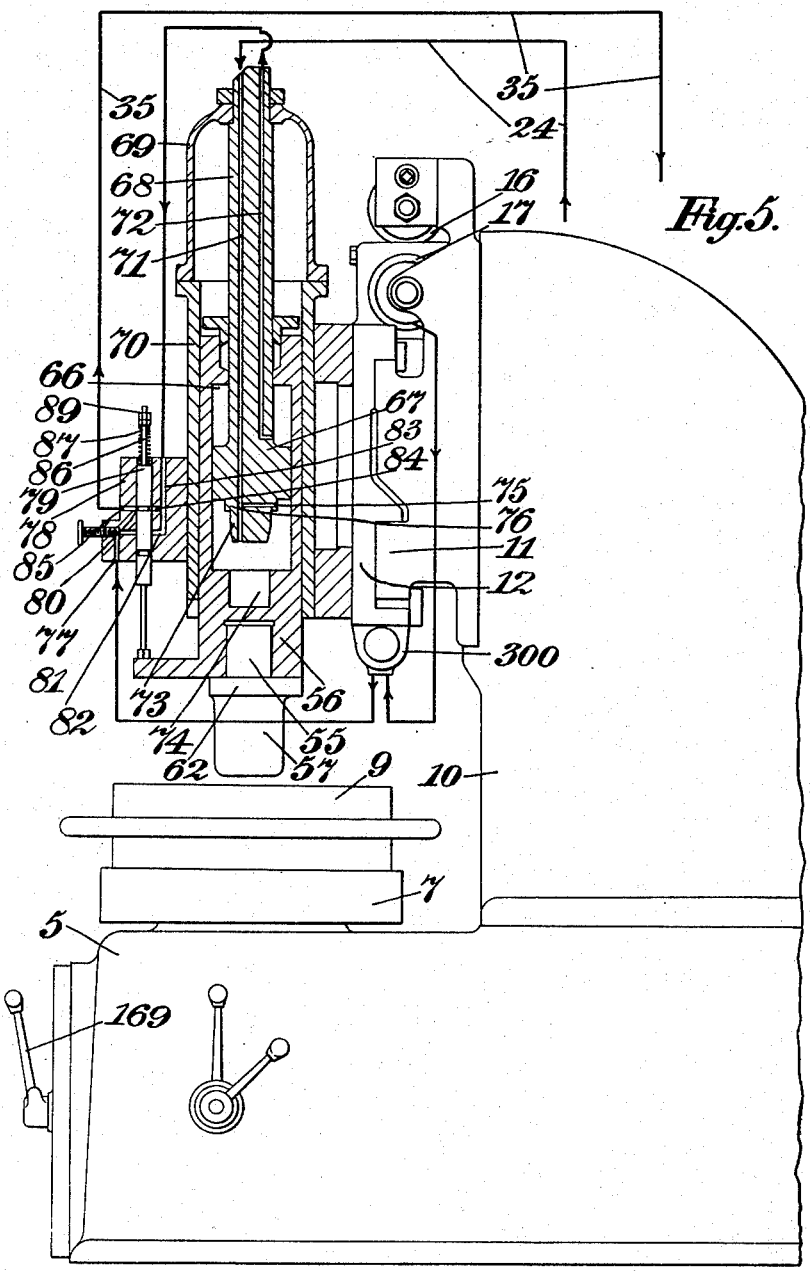
Figure 5 is a similar view but with the pre-machining head in the lowered position.

Referring now to Figures 3, 4 and 5, the pre-machining heads 12 and 14 are slidably mounted on the cross beam 11 and carry at their upper extremity the cylinders 15, 17 respectively. These cylinders 15, 17 are arranged to move with respect to fixed pistons 18, 19 carried by piston rods 20, 21 respectively. The outer extremities of these piston rods are secured to the cross beam 11 or to extensions thereof and are longitudinally adjustable for the purpose hereinafter described. Each of the pistons 18, 19 is provided with differential pistons on each of its operative faces. These pistons are referenced 18a, 18b and 19a, 19b and their purpose also will be hereinafter described.

Pressure fluid is supplied from any suitable source, for example the oil tank 22 (Figure 4) and pump 23, to the flow line 24, and this line is coupled to a port 25 (Figure 3) of a manually operable valve 26 secured to the machining head 12. A similar valve 27 is provided on the machining head 14 and has a port 28 similarly supplied from the flow line 24. The valve 26 is in the form of a piston valve having a double piston 29, 30 which controls ports 25, 31, 32, 33 and 34. The ports 31 and 32 are connected to the return line 35 for the pressure fluid, whilst the port 33 is connected by a pipe 333 to a port 36 at the right hand end (Figure 3) of the cylinder 15. The port 34 is in like manner coupled to a port 37 at the left hand end (Figure 3) of the cylinder 15.

Exactly similar connections are provided for the valve 27 associated with the pre-machining head 14, and the following explanation will therefore be confined to the pre-machining head 12 since the operation of the other pre-machining head 14 is exactly similar. With the piston valve 26 in the position shown in Figure 3 pressure is admitted through the port 25 to the interior of the valve and from thence it flows through port 34 to the left hand end of the cylinder 15. The pressure acting on the left hand end of the cylinder 15 causes the pre-machining head to move to the left towards the position shown in Figure 3. During this movement the fluid contained between the right hand end of the cylinder 15 and the adjacent side of the piston is forced through the port 36, the connecting pipe 333, the port 33, the interior of the valve 26 and the port 32 to the return line 35. Towards the end of the movement of the pre-machining head 12 to the left the differential piston 18b engages within its corresponding differential cylinder 18c provided at the right hand end of the main cylinder 15. Fluid is thereby trapped within this differential cylinder but is permitted to leak through a controllable by-pass valve 38 into an annular chamber formed between the main piston 18 and the differential cylinder 18c, into which chamber the port 36 opens. The fluid by-passed through the valve 38 is therefore returned with the main flow of fluid to the return line 35. The by-pass valve 38 may be pre-set so as to give a determined amount of cushioning effect when the pre-machining head 12 is moved to the left away from the chuck 8 into its inoperative position.

When it is desired to move the pre-machining head 12 into its operative position over the chuck 8 the valve 26 is manually operated by means of the handle 39 so as to move the double piston 29, 30 into its other extreme position. In this position pressure fluid enters the valve through port 25 as before and passes out through port 33 via the pipe connection 333 to port 36 on the cylinder 15. At the same time the port 31 is opened to the return line 35 and fluid can therefore flow from the left hand side of the piston 18 through the port 37, the connecting pipe 333, the port 34 and the port 31 to the return line.

The pre-machining head 12 will thereupon be moved to the right (Figure 3) with a relatively fast motion. Towards the end of this motion the differential piston 18a will engage the differential cylinder 18d at the left hand end of the main cylinder 15 and the fluid trapped therein is by-passed through a valve 40 to the main cylinder 15 by means of the by-pass connection 41. The by-pass valve 40 may be controlled, as for example by means of a needle valve 42, since this terminal slow motion of the pre-machining head 12 is utilized to effect one of the pre-machining operations above mentioned, namely the facing of the socket to length. The pre-machining head is finally held in its operative position over the chuck 8 by the continued pressure upon the right hand end of the cylinder 15 and when the boss 300, integral with slide 12, abuts against adjustable screws 45 carried in an abutment block 299 secured to the cross beam 11.

As soon as the facing operation has been performed the pre-machining head reaches the limit of its travel to the right (Figure 3). In this position a valve 43 carried in the boss 300 of the pre-machining slide is opened by its stem 44 coming into contact with the stop 45 carried by the cross beam 11. In this condition pressure fluid is conducted through a port 46 (which is incidentally used for the by-pass 38) to the inlet port 47 of the valve 43. In the open position of the valve 43 fluid passes through the valve and out through a port 48 to initiate the vertical movement of the pre-machining head. The fluid control of the vertical movement of the pre-machining heads will be hereinafter described. The purpose of the axial adjustment of the piston rods 20, 21 is to determine at which position, during the travel of the pre-machining head, the facing operation commences in order to allow for the facing of sockets of different diameters. Thus this adjustment enables the facing period to be limited to that necessary for the particular socket being faced.

The boring position of the pre-machining head to give the set diameter dimension is fixed by the stop 45 contact of the boss 300 of the valve 43 with which performs the dual function of firstly limiting the travel of the pre-machining head and secondly operating the valve 43.

(b) Tap head

The tap head 13 is moved along the cross beam 11 by hydraulic means similar in all respects to that provided for the pre-machining heads. The cylinder 16 carried by the tap head 13 co-operates with a piston 49 having differential pistons 49a and 49b, pressure being admitted to either side of the piston by means of a valve 50 similar to the valve 26. The cylinder in each of its end positions is adapted to contact with adjustable stops 51, 52 so that its positioning directly over the chuck 8 or 9 can be accurately determined. The tap head 13 is maintained in each of its two end operative positions by fluid pressure and its movements towards and away from these end positions is effected rapidly with a short terminal slow movement produced by the action of the differential pistons 49a, 49b within their respective differential cylinders which are provided with controllable by-passes 53, 54. The vertical movements of the tap head are produced by mechanical means associated with the drive for the chucks 8 and 9, and these means will also be hereinafter described.

DETAILS OF PRE-MACHINING HEAD AND TOOL POST

It will be convenient now to refer to Figures 6, 7 and 8 which show details of the tool post. The tool post comprises a shank 55 which is secured to the moving portion 56 (Figure 4) of the pre-machining head 12 and which is inclined so as to be parallel with the taper to be bored in the socket. The shank 55 has an extension 57 which serves to carry the tools 58 and 59. The tool 58 is adapted to face the socket to length and to produce the tapered bore. The tool 59, which is disposed at right angles to the tool 58, as will be clear from Figures 6 and 7, effects the recessing operation at the end of the socket. Due to this angular separation of the tools 58 and 59 the former will produce the desired tapered bore whilst the latter will produce an exact cylindrical access within the limits of accuracy demanded. A further tool 60 is carried by a tool holder 61 secured to a plate 62 through which the extension 57 passes. The plate 62 may be secured to the shank 55, as for example by welding as at 63. The tool 60 effects the external chamfering of the end of the socket at the completion of the boring operation, as illustrated in Figure 6.

Referring now more particularly to Figures 4 and 5, the pre-machining head 12 is adapted to house a slidable portion 56 movable in guides 64, 65 (Figure 2) and the movement slightly inclined to the vertical axis of this portion is hydraulically controlled as above mentioned. The slidable portion 56 is formed internally as a cylinder 66 with which co-operates a stationary piston 67. The piston 67 has a piston rod 68 secured to a bell housing 69 which in turn is carried by a fixed housing 70 secured to the transverse sliding head 12. The piston rod 68 is provided with a bore 71 throughout its entire length, and with a further bore 72 opening at the free end of the piston rod at one end, and opening into the cylinder 66 above the piston 67 at its other end. The piston 67 is also provided with a differential piston 73 co-operating with a differential cylinder 74 which forms an extension of the main cylinder 66. The pipe 71 opens through the face of the differential piston 73 and also into the main cylinder 66 through a duct 75. Between the differential piston 73 and the main piston 67 there is provided an annular enlargement 76 which comes into contact with the end of the cylinder 66 when the vertically moving portion 56 is in its uppermost position. In this position (Figure 4) the differential cylinder 74 is in communication through the bores 71 and 75 with the portion of the main cylinder 66 between the piston 67 and the end of this cylinder.

Pressure fluid is delivered from the flow line 24 to the bore 72 so that it is constantly delivered to the cylinder 66 above the piston 67. This has the effect of returning the sliding portion 56 to its uppermost position whenever pressure is released from the under-side of the piston 67. This is the case whenever the pre-machining head is out of contact with the stop 45 (Figure 3).

When the pre-machining head is caused to move towards this stop the tool 58 during the final slow motion of the pre-machining head faces the socket blank to length. Immediately after the facing operation has been completed the stem 44 of the valve 43 is depressed by coming into contact with the stop 45 (Figure 3). The movement of the valve 43 allows pressure fluid to pass through the valve and to enter the port 77 of the valve 78 (Figures 4, 9 and 10). The valve 78 comprises a body secured to the housing 70 and a hollow plunger 79 provided with annular grooves 80 and 81. The annular groove 81 in the position of the valve shown in Figure 9 co-operates with a port 82 which communicates with an outlet 83 which is connected to the bore 71 in the piston 67. The outlet 83 also communicates with a port 84 with which the annular groove 80 is adapted to co-operate. A further port 85 is also provided which is connected to the return line 35 (Figure 4).

Within the hollow plunger 79 there is provided an operating rod 86 the lower end of which is secured to an extension of the slidable portion 56 of the pre-machining head (Figure 4). The upper portion of the hollow plunger 79 has a larger internal diameter to house a spring 87 the lower end of which bears against the plunger whilst the upper end bears against an adjustable sleeve 88 which is locked in position on the operating rod 86 by means of a nut 89.

At the upper end of the valve 78 there is provided an operating handle 96 pivotal upon the body of the valve and having a pair of side arms 90, 91 provided with recesses within which can slide a rod 92 which is urged away from the pivot pin 93 by springs 94, 95. The central portion of the rod 92 is held in a bearing 92a formed at the upper end of plunger 79. The compression springs 94, 95 retain the handle 96 in the position shown in Figure 9, that is in the position prior to the commencement of the boring operation. As soon as presseur fluid is delivered to the pre-machining head through the valve 78 the vertically moving portion 56 commences to descend and carries with it the operating rod 86. During the downward movement, spring 87 is compressed by the resistance offered by springs 94, 95, which resistance increases until the operating handle takes up a horizontal position. Just a little below the horizontal position of the handle the compression energy of springs 87, 94 and 95 is released, urging the hollow plunger 79 downwards, towards its lower operative position. The supply of pressure fluid to the lower face of the piston 67 is thereupon terminated and the bore 71 is connected to exhaust through the annular groove 80 and port 85. The vertically moving portion 56 thereupon commences to ascend under the constant pressure supplied to the cylinder 66, the operating rod 86 being returned at the same time to its initial position. The pre-machining operations having been completed the operator will then manually operate the valve 26 to move the pre-machining head away from the socket blank and the valve 43 will thereupon close. In order to bring the hollow plunger back into its initial operative position the operating handle 96 (Figure 9) is manually moved to the position shown in Figure 9. The pre-machining head is then ready for the next cycle of pre-machining operations. It will be clear that the extent of vertical movement of the pre-machining head can be predetermined by adjustment of the sleeve 88 and associated lock nut 89 on the operating rod 86.

Figure 11:
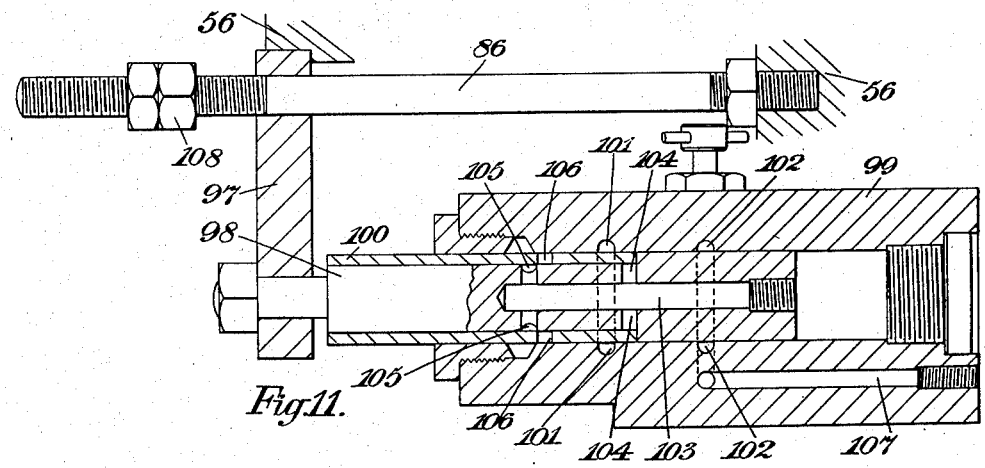
Figures 11, 12 and 13 are sectional views of a modified form of such valve.
Figure 12:
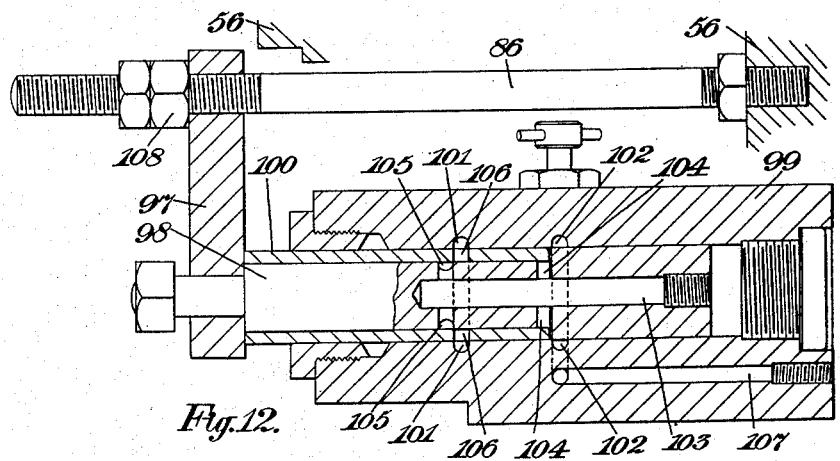
Figure 13:
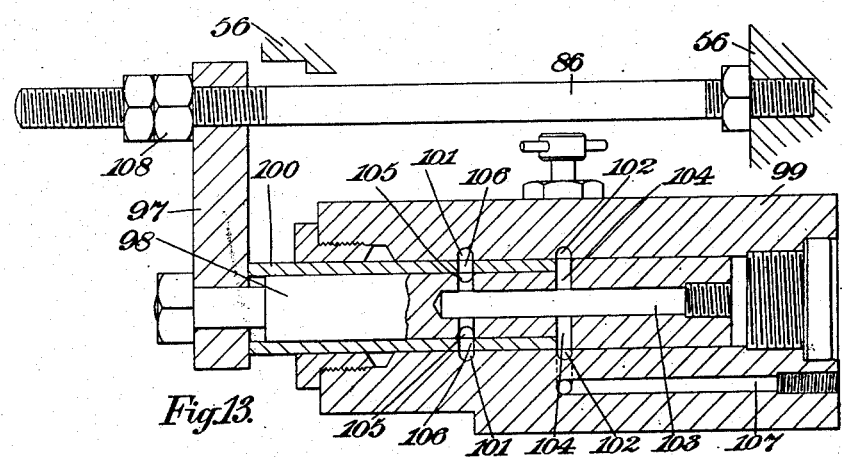

The above described form of valve is mechanically operated in one direction and manually in the other direction, but, if desired, the valve may be made fully automatic, that is to say upon the completion of the pre-machining operations the tool post may be withdrawn from the socket and the valve controlling the vertical movements may be returned automatically to its initial position ready for the next cycle of pre-machining operations. A suitable form of automatic valve is shown in Figures 11, 12 and 13. In these figures the operating rod 86 is secured to an extension of the vertically moving portion 56 of the pre-machining head and is arranged to pass freely through a cross head 97 which is adapted to be engaged in one end position by a shoulder on the portion 56 as shown in Figure 11. The cross head 97 has secured to it, with a certain amount of free play, a valve member 98 which over a portion of its length is adapted to obturate within a body 99 secured to a fixed portion of the pre-machining head. The remainder of the valve member 98 is of reduced diameter and is adapted to slide within a sleeve 100 which itself is capable of sliding movement in the body 99. In this body 99 there are provided two annular ports 101 and 102, the former being connected to the return line 35 and the latter being connected to the valve 43 and to the bore 71 of the pre-machining head (Figure 4). The valve member 98 is provided with an internal bore 103 which communicates with two sets of openings 104, 105 which are so spaced apart as to connect the annular ports 101, 102 together through the bore 103 when the valve member 98 is in the appropriate position. The sleeve 100 is also provided with a ring of ports 106 which are spaced from the end of this member by a distance which corresponds to the distance between the ports 101 and 102.

In the position of the parts shown in Figure 11 the pre-machining head is in its extreme return position, that is to say it is in the position before the commencement of the pre-machining operations. When pressure is admitted to the annular ports 102 through the inlet duct 107 the pre-machining head will descend, carrying with it the operating rod 86 and disengaging the shoulder on the sliding part 56 from the cross head 97. The downward motion continues until the cross head 97 is moved to the right (Figure 11) by engagement of the nuts 108 carried by the operating rod 86 with the cross head. The initial movement takes up the lost motion and the further movement causes the valve member 98 and the sleeve 100 to be moved to the right into the position shown in Figure 12 where the ports 106 of the sleeve register with the exhaust ports 101, the inlet ports 102 being practically entirely covered by the larger portion of the valve member 98. In this position of the ports pressure fluid is permitted to escape from the ports 102 through suitable apertures between the end of the sleeve 100 and the larger portion of the valve member 98 into the bore 103 of the said member. This pressure acting on the valve member 98 and upon the sleeve causes the rapid separation of these members which is permitted by the lost motion provided between the valve member 98 and the cross head 97 so that the parts assume the relative positions shown in Figure 13. In this position the exhaust ports and inlet ports are in direct communication with one another through the bore 103 and the space beneath the piston 67 is placed to exhaust through the bore 71, duct 107, etc. The vertically moving portion 56 thereupon moves upwards and the operating rod 86 is moved towards its initial operative position. Towards the end of this return motion of the pre-machining head the cross head 97 is engaged by the before-mentioned shoulder and is carried back into the initial position, the parts then assuming once more the relative positions shown in Figure 11, and the valve is reset for the next cycle of pre-machining operations.

It will be understood, of course, that whilst the above description has been concerned solely with one of the pre-machining heads, exactly the same arrangements are adopted for the other pre-machining head which is controlled in a like manner.

FACE PLATE DRIVES

The drives for the face plates 6 and 7 are shown diagrammatically in Figure 14 and are obtained from a prime mover such as an electric motor 109. The said prime mover may be coupled to the face plates through the intermediary of a variable speed gear box 110 which is desirable in order to obtain the necessary speed variations of the face plates required for the machining and screw threading operations.

The variable speed gear box 110 has two driven shafts 111, 112, which are each coupled through suitable gearing to the associated chuck spindles 113, 114. The drives from each shaft to each spindle are identical, and therefore only one will be described, but it is to be understood that the same parts are provided for each spindle.

The driven shaft 111 of the variable speed gear box 110 has mounted upon it a gear wheel 115 which engages with a further gear wheel 116 which forms one of a pair of speed reducing idler wheels, the other, 117, of which meshes with a gear wheel 118 loosely mounted upon the spindle 113. The driven shaft 111 also carries freely mounted upon it a further gear wheel 119 which is adapted to drive through an idler 120 a gear wheel 121 secured to the spindle 113. The gear wheel 119 carries one portion of a clutch the other portion of which is slidably but not rotatably mounted upon the shaft 111 and is operated by a suitable operating handle (not shown). The gear wheel 118 loosely mounted on the spindle 113 has a single claw projection 122 which is adapted to be engaged by a similar claw projection 123 provided on a clutch member 124 slidably but non-rotatably mounted upon the chuck spindle 113 and controlled by a suitable handle (not shown). When the clutch member 124 is disengaged from the single claw projection 122 the spindle 113 and associated face plate 6 may be driven by engagement of the clutch carried by the driven shaft 111. This latter drive comprising the gear wheels 119, 120 and 121 is the fast drive for the table which is employed for the pre-machining operations where a cutting speed of 150 feet per minute (for example) is desirable. When this drive is disengaged and the clutch carried by the spindle 113 is engaged the face plate speed is reduced, for example, to 12 feet per minute, which is a suitable screwing speed.

The spur wheel 118 loosely rotating on spindle 113 is permanently connected to a further gear wheel 125 which is adapted to rotate a shaft 126 (shown diagrammatically in Figure 14) which conveys a drive to the tap head lead screw, and this drive will be hereinafter described more particularly with reference to Figure 15.

TAP HEAD DETAILS

Figure 15:
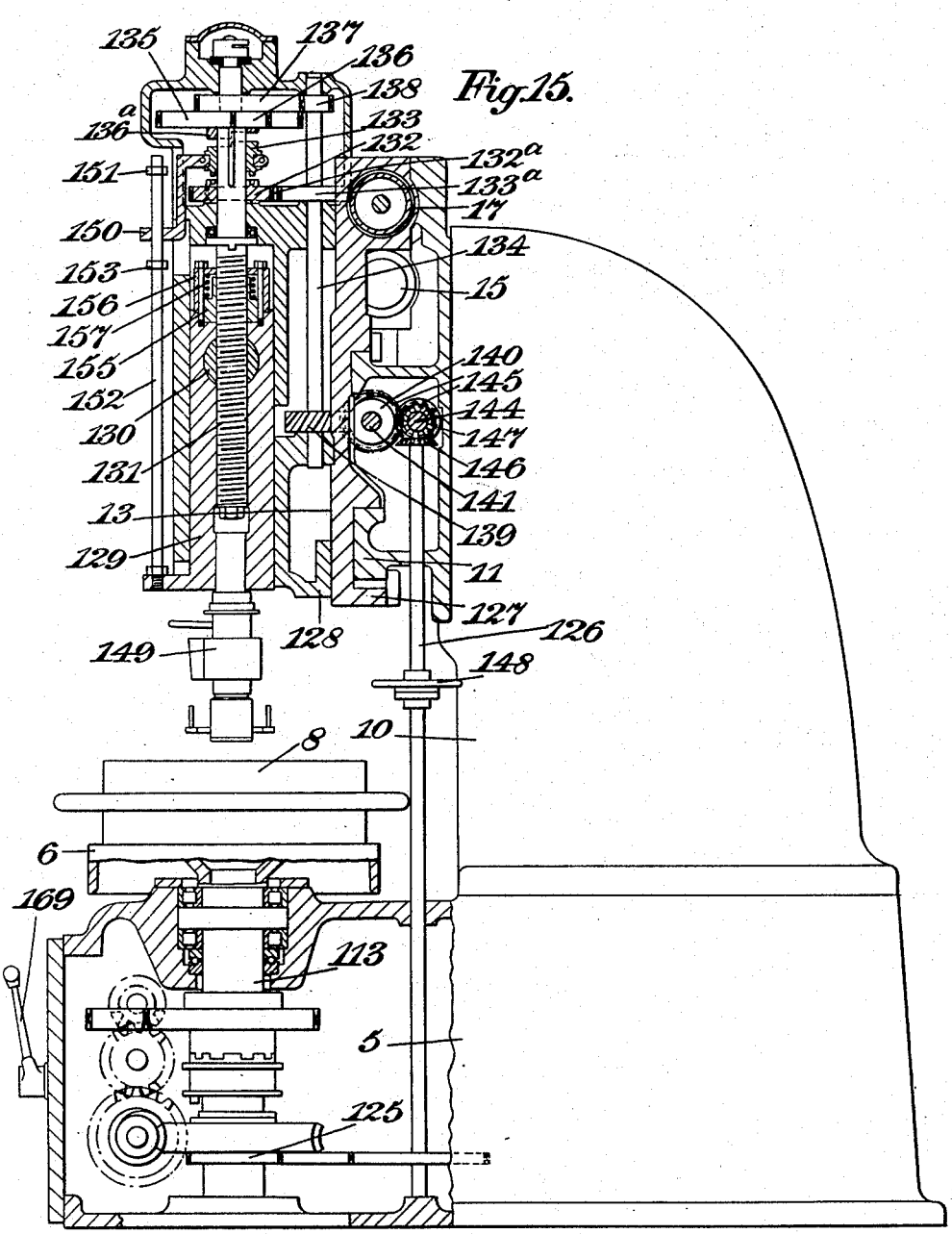
Figure 15 is an end view of the machine with the tap head in section.

Referring now particularly to Figures 14 and 15, the tap head 13 comprises a slide 127 adapted to be moved along the cross beam 11, and a housing 128 secured to the slide 127 which, in turn, carries the vertically moving portion 129. This latter portion 129 has secured within it a lead screw nut 130 co-operating with the lead screw 131 which is carried in bearings at its upper end in the slide 128. The lead screw 131 is adapted to be driven through two trains of gears the first of which comprises a gear wheel 132 loosely mounted upon the lead screw and provided with dog clutch serrations adapted to engage similar serrations on the dog clutch 133 which is slidably but non-rotatably mounted upon the lead screw 131. The gear wheel 132 meshes with an idler 132a which in turn meshes with a further gear wheel 133a secured on the vertical shaft 134 carried in bearings at its upper and lower extremities in the slide 128. The other train of gears comprises a gear wheel 135 rotatably mounted on the lead screw 131 and adapted to be secured thereto by a single dog clutch serration 136a which engages a co-operating serration on the clutch portion 133. The gear wheel 135 meshes with a small gear wheel 136 which is coupled to the gear wheel 137 which meshes with a further gear wheel 138 carried on the vertical shaft 134. The gear train comprising the gear wheels 135, 136, 137 and 138 is a speed reducing train for giving the slow downward movement of the vertically moving portion 129. The vertical spindle 134 carries a further skew gear wheel 139 which is driven by a further skew gear wheel 140 slidably but non-rotatably mounted upon a shaft 141 carried in bearings 142, 143 (Figure 2) in the belly of the cross beam 11. This shaft 141 receives its rotation from a further shaft 144 through the medium of a pair of gear wheels diagrammatically shown at 145 (Figure 2), the shaft 144 being carried in bearings in the cross beam 11. The shaft 144 in turn receives its drive from the shaft 126 (Figure 14) through the medium of a pair of bevel wheels 146, 147. The shaft 126 (Figure 15) is split and provided with an adjustable coupling 148 which comprises two parts each of which is secured to one portion of the shaft 126 so that the upper portion of the shaft 126 may be adjusted angularly in relation to the lower portion of the shaft 126 and locked in this angularly adjusted position. The purpose for which this coupling 148 is provided will be hereinafter described. It will be clear that the shaft 126 receives a continuous rotation from the variable speed gear box 110, and this rotation is conveyed to the lead screw through the clutch 133. In the upper position of this clutch (Figure 15) the lead screw is rotated slowly so as to move the portion 129 of the tap head downwards to effect the tapping operation. When the clutch is in its lower position the gear train comprising the wheels 132 and 133 is brought into operation, the other train running freely, and the lead screw is given a faster rotation in the reverse direction to withdraw the portion 129 and, consequently, the tapping tool from the socket. The tapping tool 149 is of any convenient kind and may, for example, be a receding chaser collapsible tap the cutting elements of which are non-rotatable but are receded as the tap proceeds into the socket so that the tapered bore of the socket may receive a tapered thread.

The clutch 133 may be mechanically operated so that when the tap reaches its lowest position the clutch is disengaged from the tapping drive. This may conveniently be accomplished by providing the clutch 133 with a striker bar 150 which is engaged by a tappet 151 adjustably secured on a rod 152 carried by the vertically moving portion 129 of the tap head. The fast upward drive for the tap head may also be disengaged by arranging a further tappet 153 on the rod 152 so that when the vertically moving portion 129 nears the top of its travel the tappet 153 will engage the striker bar 150 and disengage the clutch 133. As shown in Figure 2 the striker bar 150 is preferably also mechanically coupled to a manually operable handle 154 so that the clutch may be positively engaged by hand to start the tapping operation.

Further, means may be provided to counteract chatter of the lead screw 131 in the lead screw nut 130, and these means may comprise an auxiliary nut 155 carried by the lead screw 131 and a housing 156 secured to the portion 129, a spring 157 being interposed between the nut 155 and the housing 156 so as to maintain one face of the threads of the lead screw 131 constantly pressed against one face of the threads of the lead screw nut 130.

REVERSIBLE CHUCK

Referring now to Figures 16 and 17, the reversible chuck 8 or 9 (Figure 2) comprises a body portion 158 which is substantially in the form of a cylinder closed at one end. Within this body 158 there is mounted a substantially rectangular frame 159 which has trunnions 160 engaging in the walls of the body 158 so that the frame 159 may be rotated with respect to the body. The trunnions 160 are hollow and are provided internally with nuts 161 which are engaged by threaded bolts 162 carrying chuck jaws 163 which are adapted to grip the socket blank. In order to secure the frame 159 against rotation, wedge blocks 164 are provided which are adapted to be inserted beneath the frame 159 by the engagement of bolts 165 with threaded apertures in the wedges 164. The bolts 165 may be provided with pinions 166 which are in engagement with a circular rack 167 which can be manually rotated by a circular hand wheel 168. In order to secure a socket blank in the chuck the threaded bolts 162 are operated to separate the chuck jaws 163 and the socket is inserted so that its one end face rests upon an extension of the wedges 164 as shown clearly in Figure 17. The chuck jaws are then tightened so as to grip the socket in a central position. The pre-machining and tapping operations are then performed on the top half of the socket and in order that the other end of the socket may be treated in a like manner the hand wheel 168 is manually rotated in the appropriate direction to cause withdrawal of the wedges 164 from the frame 159. As soon as the wedges have been withdrawn sufficiently far the frame carrying the partly machined socket may be rotated in its trunnions so that the socket is reversed end for end. The hand wheel 168 is then again operated in order to replace the wedges beneath the frame 159. The further machining and tapping operations may then be performed.

TAP HEAD DRIVE SETTING FOR CONTINUITY OF THREAD

As has been previously stated it is a requirement for boring tube sockets that the internal thread should be continuous from one end of the socket to the other, although the complete thread has a double taper, its smallest diameter being at the middle of the socket as is clearly shown in Figure 1.

In view of the fact that each socket is machined and tapped at one end before the other end has been machined it is necessary that means be provided to ensure that when the socket is reversed for the second threading operation to be performed the tapping operation will be started at the correct point on the circumference of the machined blank so that the second thread will accurately run into the first thread at the middle of the socket. The actual setting operations will now be described so that the operation of the means previously referred to for ensuring continuity of thread will be clearly understood.

Referring now to Figure 2, let it be assumed that a socket blank has been inserted in the chuck 8 and that the pre-machining operations have been completed on one end only of this socket. The pre-machining head 12 is then moved to the left and the tap head 13 brought over the socket blank. The coupling 148 (Figure 15) is then disconnected and the tapping tool is brought down by hand rotation of the upper portion of the shaft 126, the clutch 133 being engaged with the clutch portion on the gear wheel 135 until the distance from the centre of the vice body (and thus from the centre of the socket) and a selected tooth of the tapping tool measures exactly a multiple of the pitch of the thread to be cut. The two parts of the coupling 148 are then secured together and the setting up operation is complete. The drive for the face plates is through a single claw clutch 122, 123 (Figure 14) previously referred to and through the single claw clutch 133, 136 (Figure 15). Since the tapping tool has been set as above described the engagement of the drive for the downward movement of the tap can only be made when the socket blank has the correct angular position relative to the tapping tool. By reason of this fact when the first thread has been cut in a blank and the blank is then reversed end for end in the chuck above described it follows that the succeeding tapping operation on the other end of the blank will be carried out so that the second thread accurately meets the first thread so as to produce a continuous thread throughout the socket. It will be understood that when sockets having a different number of threads per inch have to be cut then a similar setting up operation will have to be performed, since the setting for one thread will not necessarily be correct for another thread. It may also be mentioned that since the drive for the face plates is taken from a common gear box and both face plates are driven through single claw clutches the setting up operation performed with respect to one face plate will be correct for the other face plate also provided that the claw projection 122 of each of the gears 118 is initially set up with respect to the drive from the gear box 110 so that each bears the same angular relationship to a selected tooth of the tapping tool when the gear wheels 118 are stationary.

SEQUENCE OF OPERATIONS

Referring now particularly to Figures 2 and 18 in commencing the mass production of boring tube sockets the first blank is set up in the chuck 8, the tap head 13 and the pre-machining head 14 are moved to the right (Figure 2) and the pre-machining head 12 is hydraulically brought over the socket by operation of the handle 39. The face plate 6 is given its high speed of rotation by engagement of the clutch associated with the gear wheel 119. This is effected by operation of the handle 169 (Figure 2) which is moved in one direction to engage this clutch and in the other direction to engage the clutch 123. The pre-machining operations are thereupon automatically carried out and the boring tools returned to their uppermost position. This first operation is shown in line A of Figure 18. The pre-machining head 12 is then moved to the left by further operation of the handle 39 and the tap head 13 is brought over the blank and the above mentioned setting operations performed, having regard to the particular pitch of thread to be cut in the socket. The tapping operation is then commenced by operation of the handle 154 to engage the tap head clutch 133 with the slow speed train, and the tapping operation proceeds to completion when the tapping tool is withdrawn automatically from the socket. During this tapping operation a further blank is set up in the chuck 9 and the pre-machining head 14 is brought over this socket, and the pre-machining operations are carried out while the tapping operation on the first blank proceeds. This stage of the operations is shown in line B of Figure 18. Upon completion of the tapping operation on the socket in chuck 8 and the pre-machining operation on the socket in chuck 9 the pre-machining head 14 is hydraulically moved to the right by operation of the handle 39 and the tap head 13 is moved over this socket. The socket in chuck 8 is then reversed end for end and the pre-machining head 12 is brought over this socket to effect the pre-machining operations on the other half of the socket. At the same time the tapping operation on the first end of the socket in chuck 9 is proceeded with. This stage is shown in line C of Figure 18.

Upon completion of the pre-machining and tapping operations the pre-machining head 12 is moved to the left and the tap head is also moved to the left over the socket in chuck 8. The socket in chuck 9 is reversed end for end and the pre-machining head 14 is brought over this socket so that the pre-machining operations on the second end may be carried out whilst the tapping operation proceeds on the second end of the socket in chuck 8. This stage is shown in line D of Figure 18. A third socket is then inserted in chuck 8 and the pre-machining operation carried on while the tapping of the second end of the socket in chuck 9 proceeds. This stage is shown in line E of Figure 18. The subsequent production of sockets is carried on by repetition of the above sequence of operations, and it will be appreciated that the tapping tool is almost continuously in use since the tapping operation occupies a longer time than the pre-machining operation.

It will be understood that the invention is not limited to the foregoing details of construction which may be variously modified to suit the particular requirements and practical conditions which it is desired to fulfil, since, for example, the apparatus may be arranged so that the movements of the pre-machining and tap heads are horizontal instead of vertical and also more than two pre-machining heads may be employed in association with one or more tap head.

Nor is the invention limited to the machining of sockets which have been selected merely by way of example in order to describe one mode of carrying out the invention since the invention may be utilized for machining other objects subject to suitable modification as to the utilization of same or all of the features above described.

Having now described my invention, what I claim as new and desire to secure by Letters Patent is:—

1. A machine for fabricating a pipe socket or like blank comprising a reversible chuck for the workpiece, a tool post, a guide for the tool post inclined to the longitudinal axis of the socket, a plurality of tools so disposed upon the tool post as to effect a plurality of machining operations upon the workpiece and means for traversing the tool post along said guide so that the tools can machine the workpiece in one progressive movement, said tools including a cutting tool mounted upon the tool post in such a position that its cutting edge lies at one end of a first diameter of said socket and so that its movement relatively to the socket produces a taper bore and a second cutting tool mounted upon the tool post so that its cutting edge lies at the end of a second diameter of the socket at right angles to the said first diameter so that this second tool produces a substantially cylindrical bore.

2. A machine for fabricating a pipe socket or jointing pipe of the internally screwed type comprising means for holding the workpiece, a tool post, a guide for the tool post inclined to the longitudinal axis of the socket, a plurality of tools so disposed upon the tool post as to effect upon the workpiece the premachining operations of facing to length, boring, recessing and chamfering thread start and chamfering outside and means for traversing the tool post along said guide so that the tools can premachine the workpiece in one progressive movement, said tools including a cutting tool mounted upon the tool post in such a position that its cutting edge lies at one end of a first diameter of said socket and so that its movement relatively to the socket produces a taper bore and a second cutting tool mounted upon the tool post so that its cutting edge lies at the end of a second diameter of the socket at right angles to the said first diameter so that this second tool produces a substantially cylindrical bore.

3. A machine for fabricating a pipe socket or like blank comprising means for holding the blank, a tool post, a guide for the tool post inclined to the longitudinal axis of the socket, a plurality of tools rigidly mounted upon the tool post and each arranged to perform a different machining operation upon the blank, and means for traversing the tool post along said guide so that the different machining operations can be performed in one progressive movement, said tools including a cutting tool mounted upon the tool post in such a position that its cutting edge lies at one end of a first diameter of said socket and so that its movement relatively to the socket produces a taper bore and a second cutting tool mounted upon the tool post so that its cutting edge lies at the end of a second diameter of the socket at right angles to the said first diameter so that this second tool produces a substantially cylindrical bore.

4. A machine for fabricating pipe sockets of the internally screwed type comprising two premachining heads, two reversible chucks and a screw threading head, a plurality of tools carried upon each premachining head so as to perform the operations of facing a socket to length, boring, recessing and chamfering thread start and chamfering outside, and means for moving the said heads so that while one end of one socket is being premachined by one of the premachining heads the end of another socket which was previously premachined by the other premachining head can be simultaneously threaded by the screw threading head.

5. A machine for fabricating pipe sockets of the internally screwed type comprising two premachining heads, two reversible chucks and a screw threading head, a plurality of tools carried upon each premachining head so as to perform the operations of facing a socket to length, boring, recessing and chamfering thread start and chamfering outside, means for moving the premachining heads and the screw threading head into positions where two of the heads are positioned opposite the said chucks, and means for moving the premachining heads and the screw threading head so that their respective operations are performed upon the sockets in one progressive movement.

6. A machine for fabricating a pipe socket or jointing pipe comprising a tool post, a guide for the tool post inclined to the longitudinal axis of the socket, a plurality of tools carried upon the tool post so as to perform upon the workpiece the premachining operations of facing to length, boring and recessing and chamfering thread start and chamfering outside, a chuck for holding the workpiece and means for moving the tool post first transversely with respect to the workpiece and then substantially axially thereof and along said guide so that the premachining operations are performed in one progressive movement of the tool post, said tools including a cutting tool mounted upon the tool post in such a position that its cutting edge lies at one end of a first diameter of said socket and so that its movement relatively to the socket produces a taper bore and a second cutting tool mounted upon the tool post so that its cutting edge lies at the end of a second diameter of the socket at right angles to the said first diameter so that this second tool produces a substantially cylindrical bore.

7. A machine for fabricating a pipe socket or jointing pipe of the internally screwed type comprising a premachining head and a screw threading head, a plurality of tools carried upon the premachining head so as to perform upon the workpiece the premachining operations of facing to length, boring and recessing and chamfering thread start and chamfering outside, means for moving the premachining head relatively to the workpiece so that the tools thereon perform their respective operations in one progressive movement, means for moving the screw threading head relatively to the work so that the threading operation is performed in one progressive tool movement, and driving means for maintaining rotation of the workpiece, the said driving means being interconnected with the means for moving the screw threading head.

8. A machine for fabricating a pipe socket or jointing pipe of the internally screwed type comprising a premachining head and a screw threading head, a plurality of tools carried upon the premachining head so as to perform upon the workpiece the premachining operations of facing to length, boring and recessing and chamfering thread start and chamfering outside, means for moving the premachining head first transversely of the workpiece and then substantially axially thereof so that the tools upon the premachining head perform their respective operations in one progressive movement, means for moving the screw threading head relatively to the work so that the threading operation is performed in one progressive tool movement, and driving means for maintaining rotation of the workpiece, the said driving means being interconnected with the means for moving the screw threading head.

9. A machine as claimed in Claim 8 wherein the transverse movement of the premachining head comprises a fast period followed by a slow period.

10. A machine for fabricating a pipe socket or jointing pipe of the internally screwed type comprising a premachining head and a screw threading head, a plurality of tools carried upon the premachining head so as to perform upon the workpiece the premachining operations of facing to length, boring and recessing and chamfering thread start and chamfering outside, means for moving the premachining head transversely of the workpiece so that the transverse movement comprises a fast period followed by a slow period and, at the termination of the transverse movement, for moving the premachining head substantially axially of the workpiece so that the tools upon the workpiece perform their respective operations upon the workpiece in one progressive movement, means for adjusting the slow transverse movement of the premachining head, means for moving the screw threading head relatively to the work so that the threading operation is performed in one progressive tool movement, and driving means for maintaining rotation of the workpiece, the said driving means being interconnected with the means for moving the screw threading head.

11. A machine for fabricating a socket with a cylindrical bore followed by a tapered bore comprising in combination a chuck for holding the socket, means for rotating said chuck, a tool post, a guide for the tool post inclined to the longitudinal axis of the socket, means for traversing the tool post along the guide, a cutting tool mounted upon the tool post in such a position that its cutting edge lies at one end of a first diameter of said socket and so that its movement relatively to the socket produces a taper bore and a second cutting tool mounted upon the tool post so that its cutting edge lies at the end of a second diameter of the socket at right angles to said first diameter so that this second tool produces a substantially cylindrical bore simultaneously with the production of the taper bore when the tool post is traversed along its guide.

RUDOLF FRANCIS WEISER.